United States Patent [19]
Koslov et al.

[11] Patent Number: 5,692,013
[45] Date of Patent: Nov. 25, 1997

[54] SHARED RESOURCES MODULATOR-DEMODULATOR CIRCUITS FOR USE WITH QUADRATURE AMPLITUDE MODULATED SIGNALS

[75] Inventors: Joshua Lawrence Koslov, Hopewell; Frank Anton Lane, Medford Lakes; Carl G. Scarpa, Somerset, all of N.J.

[73] Assignee: Hitachi America, Ltd., Tarrytown, N.Y.

[21] Appl. No.: 554,696

[22] Filed: Nov. 7, 1995

[51] Int. Cl.$^6$ .................................................. H04L 27/10
[52] U.S. Cl. .................... 375/277; 375/219; 375/222; 375/298; 375/321; 329/304; 332/103
[58] Field of Search .............................. 375/277, 219, 375/216, 270, 298, 301, 320, 321, 222; 329/304, 347, 357; 332/103, 149, 170; 364/724.1

[56] References Cited

U.S. PATENT DOCUMENTS

| 5,259,000 | 11/1993 | Kojima et al. | 375/222 |
| 5,633,891 | 5/1997 | Rebec et al. | 375/219 |

OTHER PUBLICATIONS

Draft Report, VSB Transmission System—Grand Alliance, Technical Details; Dec. 7, 1994.

Primary Examiner—Wellington Chin
Assistant Examiner—Congvan Tran
Attorney, Agent, or Firm—Michaelson & Wallace; Peter L. Michaelson

[57] ABSTRACT

A common transceiver circuit for use as either a modulator or demodulator and that is implemented through a shared resource approach. This approach is particularly, though not exclusively, suited for with quadrature amplitude modulated (QAM) or vestigial sideband (VSB) signals. Specifically, a QAM transceiver circuit (400), through strategically located multiplexing stages, physically re-uses both a complex Nyquist filter (310, 320) and an equalizer (140) for demodulation and modulation. Additionally, tap coefficients of the complex Nyquist filter are set such that a center frequency of an otherwise baseband Nyquist filter is translated upward to a symbol rate in order to eliminate a separate complex mixer (250, 260). Similarly, a VSB transceiver circuit (700), also through strategically located multiplexing stages, physically re-uses a complex vestigial Nyquist filter (610), a complex mixer (620) and an equalizer (785) during demodulation and modulation. The VSB transceiver also selects a particular configuration of a common complex Hilbert transform circuit (720) for use during either demodulation or modulation. In either transceiver, the same equalizer selectively provides both channel equalization, during de-modulation, and (sin x)/x compensation, during modulation, through use of differing corresponding sets of tap coefficients.

30 Claims, 8 Drawing Sheets

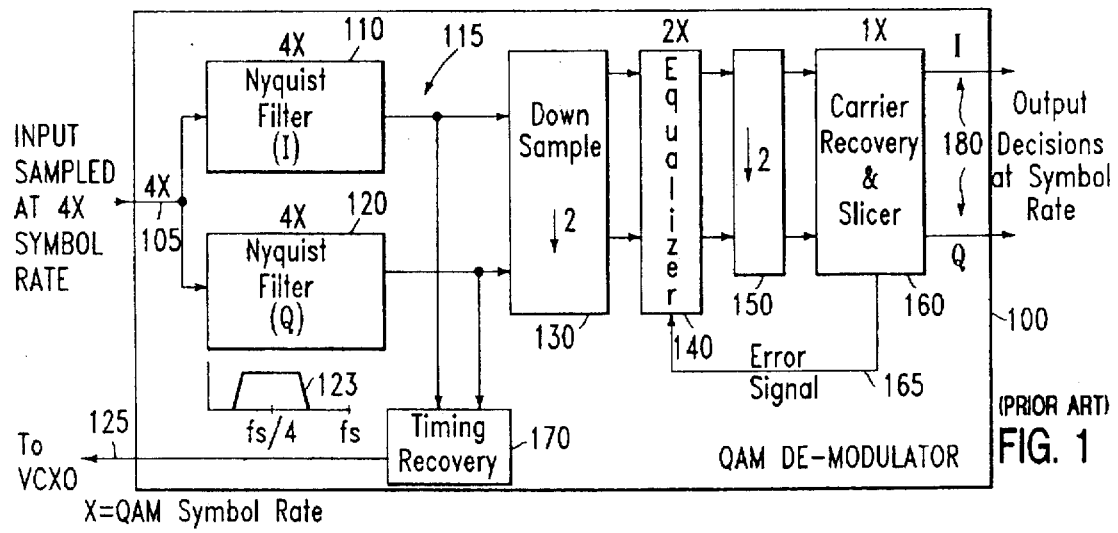
FIG. 1 (PRIOR ART) QAM DE-MODULATOR
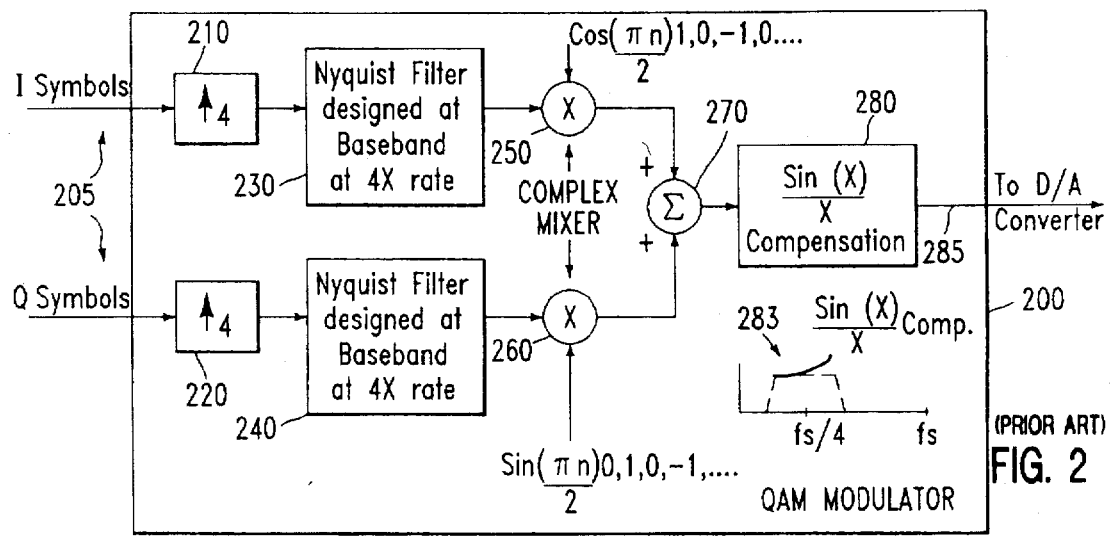
FIG. 2 (PRIOR ART) QAM MODULATOR
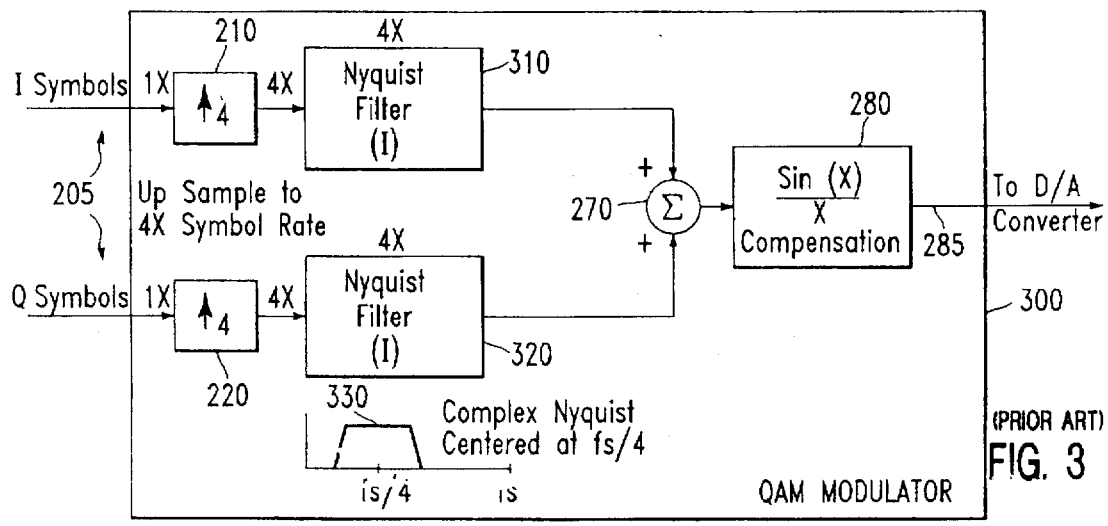
FIG. 3 (PRIOR ART) QAM MODULATOR

| FIG. 4A | FIG. 4B |

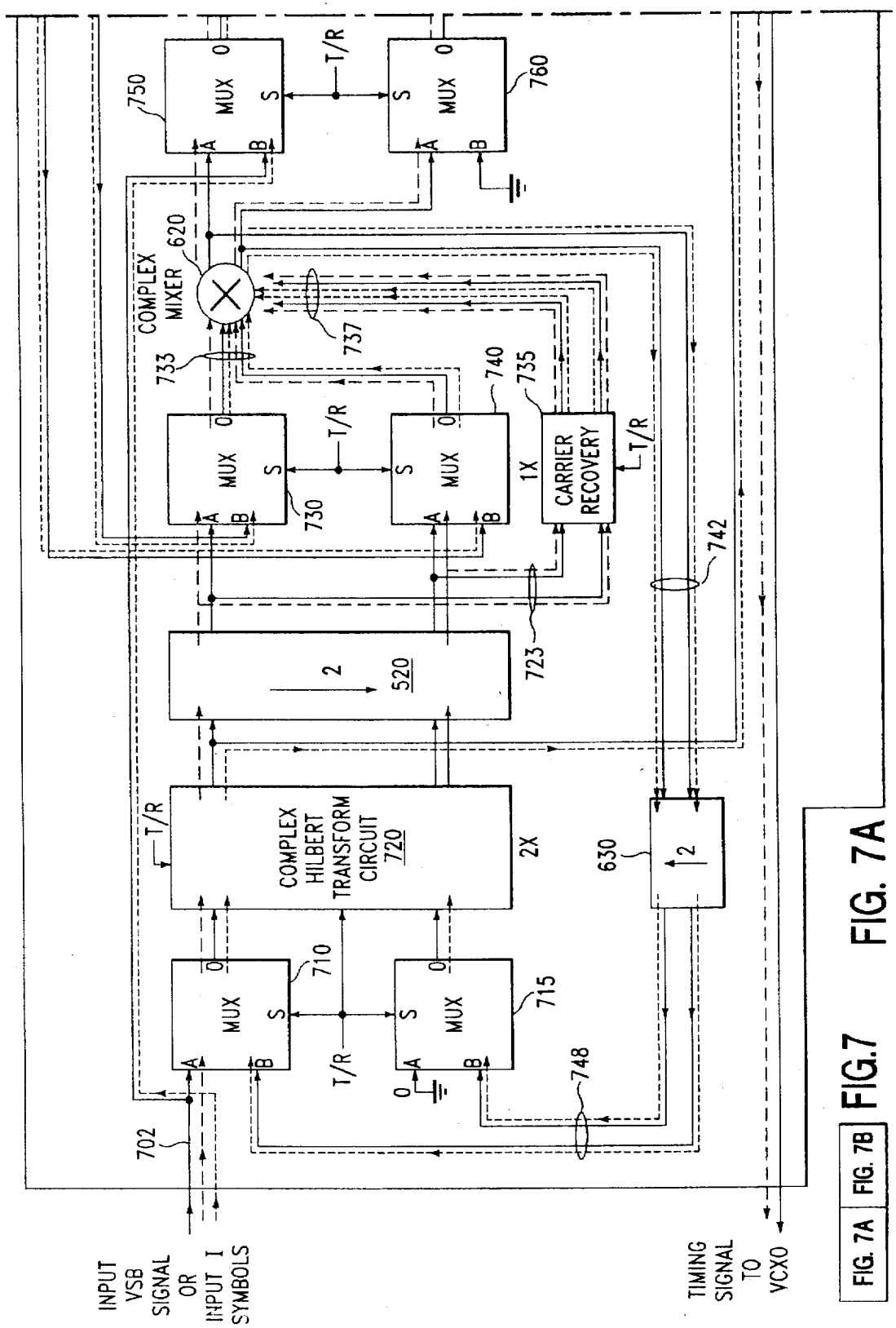

SHARED RESOURCES MODULATOR-DEMODULATOR CIRCUITS FOR USE WITH QUADRATURE AMPLITUDE MODULATED SIGNALS

BACKGROUND OF THE DISCLOSURE

1. Field of the Invention

The present invention relates to a common transceiver circuit, for use as either a modulator or demodulator, that is implemented through a shared resource approach. This approach is particularly, though not exclusively, suited for use with quadrature amplitude modulated (QAM) or vestigial sideband (VSB) signals.

2. Description of the Prior Art

In view of the significantly increased noise immunity inherent in and sophisticated error correction that can be used with digital, vis-à-vis analog, signals and their associated signal processing, digital modulation, whether in conjunction with quadrature amplitude modulation (QAM) or vestigial sideband (VSB) transmission, is the transmission mode of choice in the United States for use in, among other communication systems, advanced television, specifically high definition television (HDTV), systems. Such systems are expected to start being deployed within the next few years with eventually HDTV receivers displacing traditional NTSC (National Television System Committee) analog receivers ("television sets") currently in use. In the context of HDTV systems, VSB has been chosen for use in broadcast "off-the-air" systems, while QAM is preferred for cable systems. Inasmuch as an HDTV receiver must be able to receive signals both off-the-air as well as from cable, such receivers must be able to properly receive and demodulate transmitted QAM as well as VSB signals. Furthermore, it is widely expected that in the near future, HDTV systems, whether cable or off-the-air broadcast, will be expanded to allow two-way communication in order to enable user interactivity, such as to implement video-on-demand, real-time viewer polling and other user selectable services. This expansion will necessitate inclusion of appropriate transmission circuitry within, for example, each HDTV receiver to permit communication from a viewer to a broadcaster or other central location, such as a service computer located at a cable headend.

As to error correction, digitally modulated signals are very amenable to error correction; while analog signals are not. Cable television and other forms of communications, such as, e.g., land based terrestrial microwave telephone links, currently utilize repeaters distributed along a signal path to compensate for various adverse electrical affects present in that path. Traditionally, repeaters used for analog signals—as presently used in cable television and other communication systems—merely compensated for attenuation in the channel: these repeaters received a modulated signal from a channel, amplified the received signal and transmitted a resulting amplified signal back onto the channel for carriage to a downstream location. Inasmuch as analog signal processing could not readily discriminate between a modulated data component of a signal and a channel-induced artifact that corrupted the data carried by the modulated signal, analog repeaters propagated such errors downstream ultimately leading to data errors upon demodulation at the ultimate destination at which the signal is received. In sharp contrast, digital modulation, which is experiencing increasing and widespread use—even apart from HDTV applications, advantageously permits a transmitted data signal to be easily corrected for any data errors not present in the transmitted signal. Accordingly, a repeater designed for use with digitally modulated signals will demodulate a received passband signal to baseband, employ appropriate error correction to reconstruct a "clean" digital data signal—i.e., an identical replica to that originally modulated, re-modulate the clean data signal onto a carrier frequency and finally transmit the modulated signal onward to a downstream destination location. By virtue of the error correction, the data stream appearing, upon demodulation at its ultimate received destination, contains essentially no channel-induced data errors.

Generally speaking, transceivers are used to implement two-way communication. A transceiver contains both a receiver and transmitter with an appropriate demodulator and modulator, respectively. Conventionally, transceivers, whether for digital communication or not, have been developed and manufactured with modulators and demodulators that utilize separate circuitry: one circuit specialized for service in a transceiver as a modulator, another circuit specialized for service in the same transceiver as a demodulator. Inasmuch as modulators and demodulators, such as for QAM or VSB signals, have certain common functional stages—such as, e.g., Nyquist filtering, this traditional two-circuit approach which uses duplicated circuitry to separately impart these functions to both the modulator and demodulator has proven to be rather inefficient, both in terms of the number of circuit components used, as well as the cost thereof and the required physical space therefor.

Thus, a need exists in the art for single common circuit that, with minimal, and preferably no duplication of embedded functionalities, can serve within a digital transceiver as either a digital modulator or a digital demodulator. Such a circuit would be well suited for use with modulating and demodulating QAM signals, with a variant of that circuit well suited for use in modulating and demodulating VSB signals. We expect that such circuits, given cost and space economies resulting therefrom, would find particular application in, e.g., HDTV receivers, to readily provide two-way interactivity, as well as in, e.g., repeaters designed for cable and other digital communication systems.

SUMMARY OF THE INVENTION

We have advantageously overcome the deficiencies associated with use of separate modulator-demodulator circuits as conventionally taught in the art through our inventive transceiver circuits, one for QAM and another for VSB, that share, i.e., physically re-use, various functional stages between both demodulation and modulation.

In that regard, through strategically located multiplexing stages, our inventive QAM transceiver circuit physically re-uses both a complex Nyquist filter and an equalizer for both demodulation and modulation. Specifically, multiplexors, all controlled through a common mode signal, are positioned at a complex input to the complex Nyquist filter, at an input of the equalizer, and between an in-phase output of the equalizer and an in-phase output lead from the transceiver. The mode signal is set to one of two states to cause the transceiver to de-modulate an input QAM signal applied as input to the transceiver and hence provide a stream of complex decisions on the transceiver output leads. The mode signal is set to its other state in order to cause the transceiver to modulate a stream of complex symbols applied as input to the transceiver and hence provide a QAM modulated signal on one of the transceiver output leads. Additionally, tap coefficients of the complex Nyquist filter are set such that a center frequency of an otherwise baseband Nyquist filter is translated upward to a symbol rate in order to eliminate a separate complex mixer from the transceiver that would otherwise exist in a conventional QAM modulator.

Similarly, also through strategically located multiplexing stages, our inventive VSB transceiver circuit physically shares a complex vestigial Nyquist filter, a complex mixer and an equalizer between demodulation and modulation. Specifically, multiplexors, all controlled through the same mode signal, are positioned at a complex input to a complex Hilbert transform circuit, at one complex input to the complex mixer, at a complex input to the complex vestigial Nyquist filter, at a complex input to an equalizer, and between an output of the equalizer and an output lead of the transceiver. The mode signal functions in a similar two-state fashion, as in the QAM transceiver, in order to switch the function of the VSB transceiver between VSB demodulation and VSB modulation, with an appropriate signal being applied to the transceiver input and applying a proper output signal to the transceiver output lead. The VSB transceiver also reuses, through a multiplexer, circuitry in a complex Hilbert transform circuit during both demodulation and modulation, thereby eliminating a need, that would otherwise exist, to employ two separate Hilbert transform circuits.

Advantageously, in either transceiver, the same physical equalizer, based on the state of the mode signal, selectively provides channel equalization during de-modulation and (sin x)/x compensation during modulation. State changes in the mode signal cause differing corresponding sets of tap coefficients to be loaded into the equalizer as well as to permit the equalizer to adaptively change these coefficients, during de-modulation, or not, during modulation.

BRIEF DESCRIPTION OF THE DRAWINGS

The teachings of the present invention can be readily understood by considering the following detailed description in conjunction with the accompanying drawings, in which:

FIG. 1 depicts a simplified high-level block diagram of a conventional QAM demodulator;

FIG. 2 depicts a simplified high-level block diagram of a conventional QAM modulator;

FIG. 3 depicts a simplified high level block diagram of modulator 300 similar to that depicted in FIG. 2 but with complex mixers 250 and 260 implemented within Nyquist filters 310 and 320, respectively;

FIG. 7 depicts the correct alignment of the drawing sheets for FIGS. 7A and 7B;

FIGS. 7A and 7B collectively depict our inventive VSB transceiver, which employs a VSB demodulator and VSB modulator collectively implemented through shared resources;

To facilitate understanding, identical reference numerals have been used, where possible, to designate identical elements that are common to the figures.

DETAILED DESCRIPTION

Figures 4, 4A:
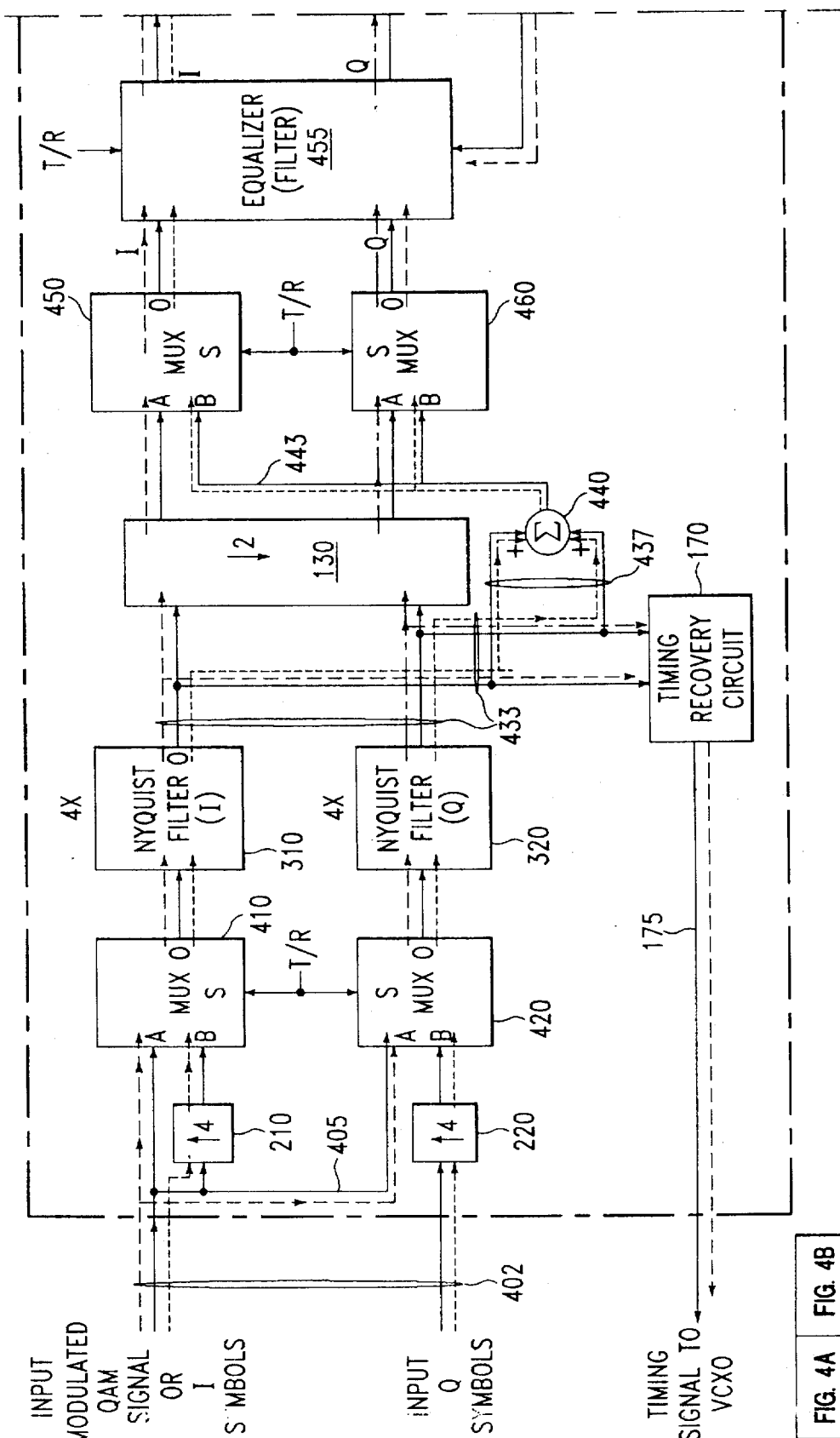
FIG. 4 depicts the correct alignment of the drawing sheets for FIGS. 4A and 4B.
FIGS. 4A and 4B collectively depict our inventive QAM transceiver, which employs a QAM demodulator and QAM modulator collectively implemented through shared resources.

After considering the following description, those skilled in the art will clearly realize that the teachings of our present invention can be readily utilized in a wide variety of digital transceivers that heretofore have utilized separate digital modulators and digital demodulators with duplicated embedded functional stages. Through use of our present invention, various functional stages are shared for use during modulation and demodulation in order to reduce circuit cost, size and complexity. To simplify the ensuing description, we will describe our invention in the context of a single modulator-demodulator transceiver circuit, premised on resource sharing, for use with quadrature amplitude modulated (QAM) signals; and another such circuit, again premised on resource sharing, for use with vestigial sideband (VSB) signals. These signals, again for simplicity of illustration, are those intended for use in high definition television (HDTV) systems.

For enhanced understanding, the following discussion will first center on conventional demodulators and modulators used in QAM and, with that as a point of departure, then address details of our present inventive teachings for use with QAM and specifically with, e.g., a shared-resource QAM transceiver circuit. Thereafter, we will address conventional VSB demodulators and modulators followed by describing our present inventive teachings for use with VSB and specifically with, e.g., a shared-resource VSB transceiver circuit. Finally, we will conclude by describing use of our inventive shared resource transceiver circuits in an illustrative application, e.g., a repeater for use with QAM or VSB digital communication.

FIG. 1 depicts a simplified high-level block diagram of a conventional QAM demodulator. This demodulator contains Nyquist filters 110 and 120 which collectively implement a complex Nyquist filter, down-sampler 130, equalizer 140, down-sampler 150, carrier recovery and slicer stage 160, and timing recovery circuit 170. An input signal, sampled at four times (4×) a symbol rate, is applied via leads 105, to in-phase and quadrature Nyquist filters 110 and 120 which are both designed to operate at passband frequencies centered at the symbol rate ($f_s$) to produce a one-sided analytic signal. Both of these filters are preferably each a multi-tap finite-impulse-response (FIR) filter centered at the symbol rate but with a differential 90° output phase shift therebetween. The approximate spectral response of each of these filters is depicted in graph 123. The resulting in-phase and quadrature symbols produced by these filters are applied by leads 115 to both timing recovery circuit 170 and down-sampler 130. The timing recovery circuit provides a timing signal, over lead 175, that is synchronized to the symbol rate of the filtered symbols. This signal is then applied to a variable oscillator (VCXO—not specifically shown) that provides a source of synchronized clock pulses occurring at the symbol rate, or multiple thereof, for synchronized sampling. These clock pulses are applied to any associated circuitry situated upstream of the demodulator, such as an analog-to-digital (A/D) converter that produces digitized sampled symbols appearing on lead 105, and/or downstream thereof. Down-sampler 130 decimates the rate of the filtered symbols by one-half. The resulting decimated symbols produced by the down-sampler are applied to complex equalizer 140, which is preferably a fractionally-spaced multi-tap filter, that attempts to remove linear channel distortions. Resulting equalized complex symbols are then applied to down-sampler 150 which further decimates the rate of the equalized symbols, by half, down to the symbol rate (1×). The resulting decimated symbols, now occurring at the symbol rate, are applied to carrier recovery and slicer 160 that halts carrier rotations and, through slicing, produces decisions as to each separate in-phase and quadrature symbol. The resulting sliced in-phase and quadrature symbols, i.e., decisions, are applied to output leads 180. In order to properly control equalization, carrier recovery and slicer 160 provides an error signal and applies that signal, via lead 165, as a feedback signal to an error input of equalizer 140.

Since a detailed understanding of the circuitry used to implement each of the stages used in this conventional QAM de-modulator, as well as in the companion QAM modulator (described in conjunction with FIG. 2 below) and in similar circuits (described below in conjunction with FIGS. 4 and 5) for VSB, is not necessary to acquire a full understanding of our present invention and since each of these stages is well known in the art, then, for the purpose of brevity, we will dispense with discussing any of these stages at any lower level of detail.

Given the constituent circuitry of a conventional QAM demodulator, FIG. 2 depicts a simplified high-level block diagram of a conventional QAM modulator. The modulator 200 contains up-samplers 210 and 220, Nyquist filters 230 and 240 which collectively form Nyquist filters, mixers 250 and 260 which collectively form a complex mixer, adder 270, and (sin x)/x compensation circuit 280. Complex input symbols are applied, via leads 205, to up-samplers 210 and 220, the former for the in-phase symbols, the latter for quadrature symbols. Up-samplers 210 and 220 respectively sample the incoming in-phase and quadrature symbols at four times their symbol rate. Given that the samples are digital, this up-sampling is accomplished by the up-samplers through a simple zero-stuffing operation in which three zeroes are inserted (padded) by the corresponding up-sampler into the in-phase and quadrature symbol streams between each pair of adjacent input samples. The resulting up-sampled complex symbol streams are applied as input to Nyquist filters 230 and 240 that are designed at baseband but operated at four times the symbol rate. Resulting filtered complex symbols are then translated up in frequency to an appropriate carrier frequency by a complex mixer, formed of mixers 250 and 260, which multiply the filtered in-phase and quadrature symbols produced by the Nyquist filters by digitized values of cosine (i.e., cos ($\pi n/2$)) and sine (i.e., sin ($\pi n/2$)) waveforms, respectively. The carrier frequency is the translation frequency, i.e., the symbol rate ($f_s/4$). The resulting translated symbol streams are added together within adder 270 with a resultant sum applied to (sin x)/x compensation circuit 280. This latter circuit provides slight high-frequency emphasis, as indicated by graph 283, to compensate for expected high frequency roll-off in a subsequent digital-to-analog converter (not shown) that produces an analog modulated QAM data stream. Generally, this compensation is only necessary for constellation sizes equal to or greater than 16. As the constellation size in use increases much above 16, the need for this compensation becomes increasingly apparent. This occurs because, as the constellation size increases, the spacing between any pair of adjacent points in the constellation decreases and, in the absence of using such compensation, the distortion caused by the D/A rolloff increasingly frustrates the ability of a receiver to properly discriminate amongst the increasing number of such points. The resulting compensated modulated signal is applied, via lead 285, to the D/A converter for conversion into an analog domain. Compensation circuit 280 can be implemented, as shown, in a digital domain and connected prior to the D/A converter or through appropriate analog circuitry positioned after this converter.

We recognize that an important component of the QAM demodulator, such as that shown in FIG. 1, is its complex Nyquist filter, specifically filters 110 and 120. The weights of the taps (also known as "tap coefficients") in each of these two filters are based on a sampling rate of four times the symbol rate. These weights are generated by taking a Nyquist filter designed at baseband and translating the center frequency up by multiplying initial values for the tap weights, i.e., those for these filters designed at baseband, by sine or cosine waveforms of an appropriate translation frequency, which here is the symbol rate. Since the sampling rate is four times the translation frequency, the sine and cosine waveforms occur at one-fourth the symbol rate and are made of simple sequences of the values 1, 0, −1, 0 ... for cosine and, with a 90° phase shift, the values of 0, 1, 0, −1 for sine. Consequently, the product of, e.g., the 1, 0, −1, 0 sequence with the initial weights for one of filters designed at baseband leads to alternating tap coefficients being zero with the sign of every fourth tap coefficient being inverted.

As to the QAM modulator, we recognize that the input stream to the complex mixer also occurs at four times the sampling rate (4×) and is multiplied, through a mixing process, by alternating values of 1, 0 and −1. Hence, we recognize that the mixing operation can be incorporated into the Nyquist filters by multiplying the digitized sine and cosine waveforms against the baseband filter tap coefficients—which advantageously is the same operation that needs to occur to properly set the tap coefficients within Nyquist filters 110 and 120 in the demodulator. As a result, through our inventive teachings, we have recognized that the resulting form of the Nyquist filters lends itself to be readily shared, i.e., re-used, between both the QAM demodulator and the QAM modulator. Advantageously, this eliminates the need to use a separate complex mixer in the QAM modulator. The resulting modulator premised on that shown in FIG. 2 but with appropriate Nyquist filter tap coefficients is shown in FIG. 3. Here, Nyquist filters 310 and 320 are the same as those used in QAM demodulator 100 shown in FIG. 1, with all other portions of modulator 300 being the same as in modulator 200 shown in FIG. 2. As with QAM demodulator 100 shown in FIG. 1, Nyquist filters 310 and 320, shown in FIG. 3, are centered (as shown by graph 330) at one-fourth the sampling rate ($f_s/4$), which given the up-sampling by four imposed by preceding up-samplers 210 and 220, equates to the symbol rate. Hence, Nyquist filters 310 and 320, and 110 and 120 (see FIG. 1), are all centered at the symbol rate and thus can be physically shared, i.e., re-used, (though not simultaneously) between QAM demodulation and modulation functions.

Furthermore, we recognize that since the (sin x)/x compensation used in QAM modulator 200 is a essentially a high-pass filter function—essentially a simple quadratic one at that, this function can be implemented by using an equalizer, which is also a filter, in lieu of using a separate compensation circuit. Hence, through judicious selection of the equalizer tap coefficients between those used for demodulation and those used for modulation, the equalizer itself can also be re-used in both the QAM demodulator and QAM modulator with the (sin x)/x compensation circuit advantageously eliminated. These coefficients can be empirically determined and, once so determined, merely remain fixed during those intervals while the equalizer is employed to provide (sin x)/x compensation during modulation. In contrast, during QAM de-modulation, the equalizer tap coefficients are permitted to adaptively change, based on an error signal, in order to properly compensate for dynamic changes in the characteristics of the communication channel.

In addition to our inventive teachings of properly changing equalizer tap coefficients between demodulation and modulation, our invention also utilizes strategically placed multiplexors to permit physical (though not simultaneous) sharing of both the Nyquist filters and the equalizer for both QAM demodulation and modulation.

Figure 4B:
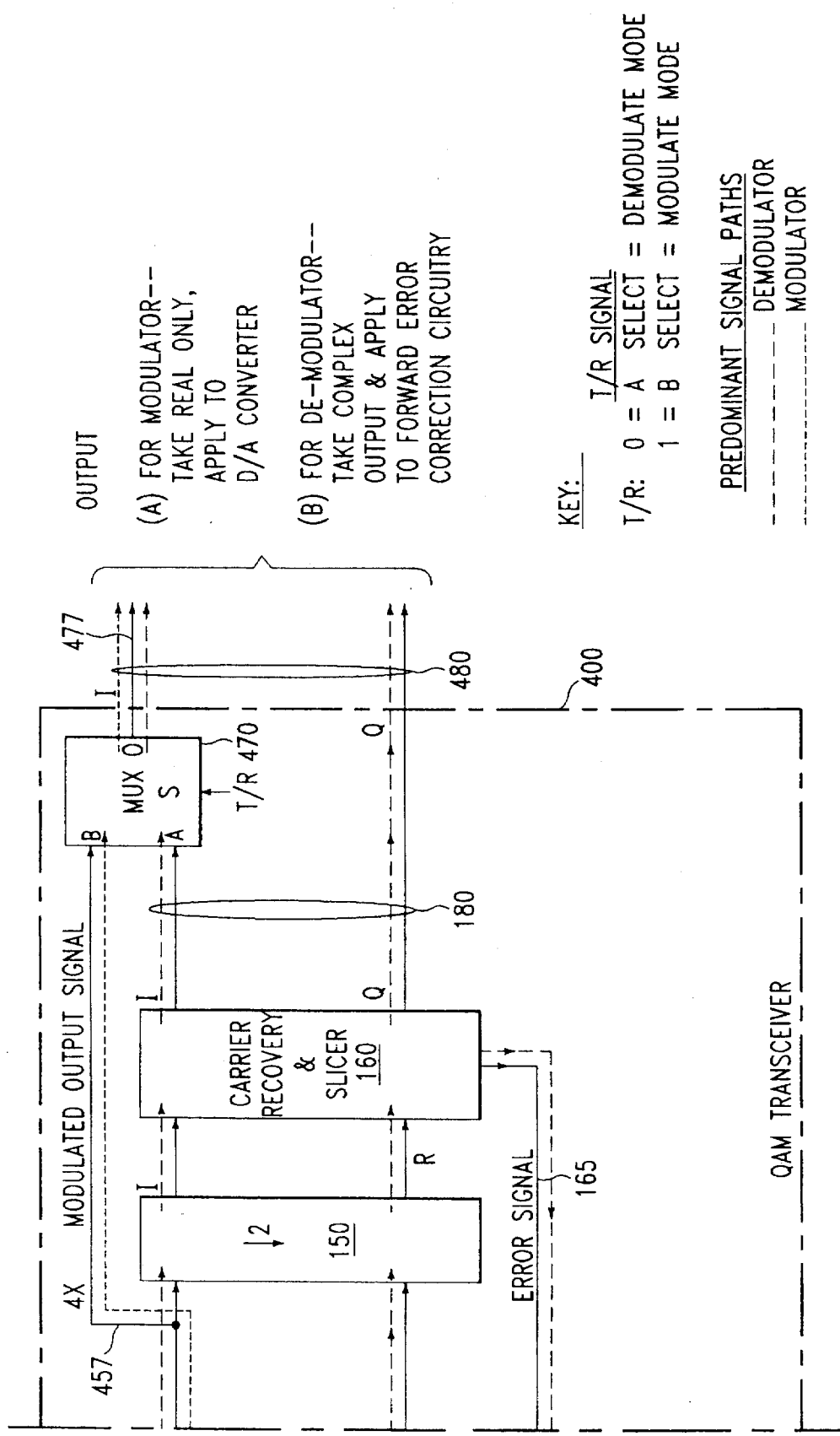

With the above in mind, our inventive QAM transceiver 400, which employs a QAM demodulator and QAM modulator collectively implemented through shared resources is collectively depicted in FIGS. 4A and 4B; the correct alignment of the drawing sheets for these figures is shown in FIG. 4. Inasmuch as various stages of transceiver 400 are identical to those previously discussed, for brevity, the following discussion will not discuss any of those stages in detail and instead will center on the differences between this circuit and the separate QAM demodulator and modulator circuits discussed above. In addition, to facilitate understanding, the predominant signal paths used for QAM demodulation and QAM modulation are respectively shown by long and short dashed lines.

As shown, the basic stages of transceiver 400, apart from the needed multiplexors, are up-samplers 210 and 220, Nyquist filters 310 and 320; down-samplers 130 and 150, equalizer 455, carrier recovery and slicer circuit 160, and timing recovery circuit 170. To implement physical resource sharing, transceiver 400 also contains three separate multiplexing stages: multiplexors 410 and 420 positioned at the complex inputs to Nyquist filters 310 and 320; multiplexors 450 and 460 at the input of equalizer 455; and multiplexer 470 positioned immediately prior to in-phase output lead 477. Each of the multiplexors has two inputs, A and B, and one output, O, with, through the state of transmit/receive (T/R) signal (also generically referred to herein as a "mode" signal) applied to the select, S, input being low (i.e., 0) or high (i.e., 1), the signal connected to the A input or B input being routed to the output O of the multiplexor. In addition, the T/R signal is also applied to the equalizer in order to permit the equalizer tap weights to adaptively change in response to an error signal, as needed in a QAM demodulator, or to set these weights to fixed values in order to implement (sin x)/x compensation for use in a QAM modulator.

With all the multiplexors configured to select the A input, hence the T/R (mode) signal set to a receive (low) state, the active signal paths through circuit 400 define a QAM demodulator circuit. In this instance, an input modulated signal applied through one of leads 402 is routed, via lead 405, through the A inputs of multiplexors 410 and 420 to Nyquist filters 310 and 320 which produce a complex filtered signal which, in turn, is applied, via leads 433, to both down-sampler by two 130 and timing recovery circuit 170. A resultant timing signal produced by circuit 170 is applied to output lead 175 for application to a variable oscillator (VCXO—not shown). The complex output of the down-sampler is applied through the A inputs of both multiplexors 450 and 460 to complex inputs of equalizer 455, which, as noted above, is configured by the low level T/R signal to adaptively vary its tap coefficients, as needed, in response to an error signal appearing on lead 165. The complex output of the equalizer is applied through down-sampler by two 150 and from there, through carrier recovery and slicer circuit 160. Circuit 160 produces an appropriate error signal which, is fed back, via lead 165, to equalizer 455 to control adaptation of its tap coefficients. The complex sliced output of circuit 160, on leads 180, are decisions. The in-phase portion of these decisions is routed, via the A input of multiplexor 470, to in-phase output lead 477 within output leads 480. The quadrature portion of these decisions is directly routed from the quadrature output of circuit 160 to a quadrature output lead within leads 480. The decisions on leads 480 are typically applied onward to a downstream forward error correction stage (not shown). All the functional demodulation signal processing, the active paths of which are indicated by long dashed lines, is the same as shown in FIG. 1.

Alternatively, with all the multiplexors configured through a high-level T/R (mode) signal, i.e., a transmit state, to select their B inputs, the active signal paths through circuit 400 define a QAM modulator. Here, a complex input signal, with both in-phase and quadrature symbols, is applied, via both of leads 402 and through the B inputs of multiplexors 410 and 420, to Nyquist filters 310 and 320 to produce a complex filtered signal. The resulting complex filtered signal is, in turn, applied, via leads 433, to both down-sampler by two 130 and via leads 437, to corresponding inputs of summer 440. Though this complex signal is also supplied, via leads 433, to timing recovery circuit 170, the output of circuit 170 has no relevance and hence is ignored during modulation; therefore this signal path involving circuit 170 is not shown for modulation. The complex output of summer 440 is applied through the B inputs of both multiplexors 450 and 460 to complex inputs of equalizer 455. Inasmuch as the equalizer is here configured by the high level T/R signal to merely provide (sin x)/x filtering of its in-phase (real) input, the in-phase output provided by the equalizer, applied to lead 457, is routed through the B input of multiplexor 470, to in-phase output lead 477 within output leads 480. The signal on lead 477 is a resulting QAM modulated signal. Again, since the quadrature output of the equalizer, along with down-sampler by two 150 and carrier recovery and slicer circuit 160 are all not used during modulation, signal paths involving these circuits are also not shown for modulation. The active signal paths that implement QAM modulation, which are indicated by short dashed lines, collectively implement the functional signal processing shown in FIG. 3. The specific implementation of equalizer 455 is well within the current level of skill in the art and hence will not be discussed in any further detail.

Figure 5:
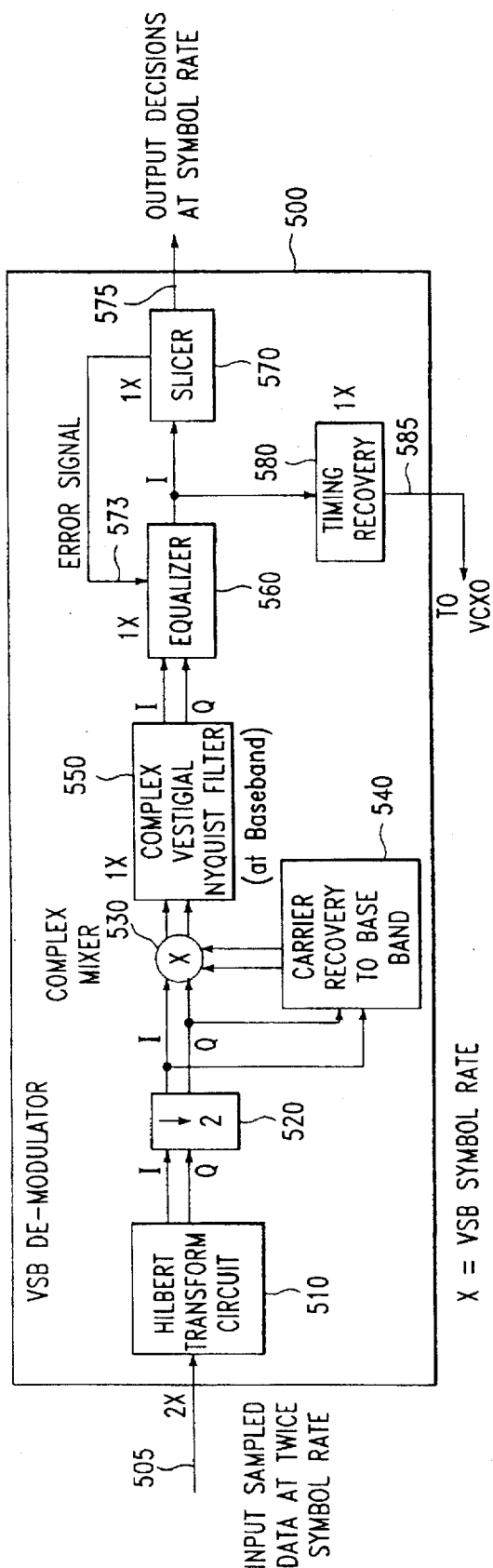
FIG. 5 depicts a simplified high-level block diagram of a VSB demodulator.

As to VSB, FIG. 5 depicts a simplified high-level block diagram of VSB demodulator 500. As shown, demodulator 500 contains Hilbert transform circuit 510, down-sampler 520, complex mixer 530, carrier recovery circuit 540, complex vestigial Nyquist Filter 550, equalizer 560, slicer 570 and timing recovery circuit 580. Incoming modulated data, sampled at twice the symbol rate (i.e., 2×), is applied through lead 505 to Hilbert transform circuit 510. This transform circuit, running at twice the symbol rate, produces an analytic signal.

Resulting complex samples produced by the Hilbert transform circuit are then applied to down-sampler 520 which decimates the rate of these samples by half. The decimated samples are applied, in turn, to separate corresponding inputs of complex mixer 530 and carrier recovery circuit 540. This recovery circuit phases locks an internal local oscillator (not specifically shown) to a transmitted pilot tone in the modulated, now decimated, VSB signal. Resulting phase-locked in-phase and quadrature carrier frequencies produced by the carrier recovery circuit are applied to another set of complex inputs to mixer 530. This mixer multiplies the decimated samples by the carrier frequencies to produce a stream of complex samples at baseband. The resulting samples are then applied to complex vestigial Nyquist filter 550 which operates at baseband and at the symbol rate (1×). Resulting filtered complex samples are applied to equalizer 560, which adaptively changes its tap weights in response to an error signal appearing on lead 573, in an attempt to remove linear channel distortions from these samples. Resulting equalized in-phase (real) symbols are applied to slicer 570 which, in turn, produces decisions and applies the resulting decisions, at the symbol rate, to output lead 575 and produces the error signal on lead 573. In addition, these equalized in-phase symbols are also applied to circuit 580 which recovers timing information therefrom. A resultant timing signal is applied, via lead 585, to control a variable oscillator (VCXO—not specifically shown) to produce a stream of clock pulses occurring at the symbol rate, and a multiple (e.g., 2×) thereof, for synchronized sampling. These clock pulses are applied to any associated circuitry situated upstream of the demodulator, such as an analog-to-digital (A/D) converter, and/or downstream thereof. Though equalizer 560 is shown as operating on a complex input, alternatively this equalizer could operate on just an in-phase input.

Figure 6:
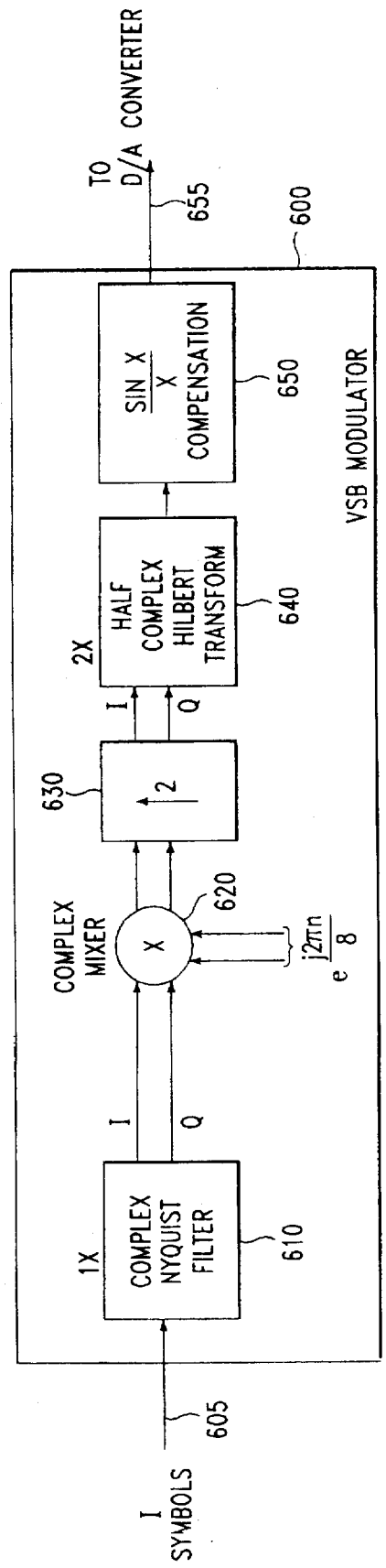
FIG. 6 depicts a simplified high-level block diagram of a VSB modulator.

In view of the constituent circuitry of a VSB demodulator, FIG. 6 depicts a simplified high-level block diagram of a VSB modulator. As shown, this modulator contains complex Nyquist filter 610, complex mixer 620, up-sampler 630, half complex Hilbert transform circuit 640 and (sin x)/x compensation circuit 650. Incoming in-phase symbols are applied, at the symbol rate, to complex Nyquist filter 610 to generate complex symbol streams and to properly shape the signal spectra of each stream. The resulting complex streams are applied to one complex input of mixer 620 with sine and cosine waveforms at a carrier frequency occurring at one-fourth the symbol rate applied to another input of this mixer. This rate is one-eighth of a final output sampling rate for VSB modulation, i.e., of a D/A converter operating on an output signal produced by modulator 600. A resulting modulated complex symbol stream produced by mixer 620 is then applied as input to up-sampler circuit 630. This up-sampler, by simply inserting a zero between each pair of corresponding (in-phase and quadrature) input symbols, increases the sampling rate of the complex modulated symbol stream by a factor of two. The up-sampled symbol streams are applied to half complex Hilbert transform circuit 640 which, operating at twice the symbol rate (i.e., 2×), converts the complex streams into a single in-phase VSB modulated symbol stream with a properly shaped signal spectra, i.e., with the VSB pilot tone corrected located in the spectrum. Only the real portion of this Hilbert transform is computed. Resulting transformed real modulated symbols are then applied to compensation circuit 650 which, in a similar manner to that of circuit 280, described above in conjunction with FIGS. 2 and 3, compensates for the expected high frequency roll-off in a subsequent D/A conversion. An appropriately compensated signal is then applied, via lead 655 shown in FIG. 6, to a D/A converter (not shown) for conversion into an analog modulated signal. As noted above, in connection with QAM modulator 200 shown in FIG. 2, the (sin x)/x compensation in VSB modulator 600 can be implemented, as shown, in a digital domain prior to the D/A converter or implemented in the analog domain through appropriate analog circuitry positioned after this converter. The resulting analog modulated VSB signal is centered at one-half of the symbol rate with a carrier frequency occurring at one-fourth of the symbol rate.

Figure 9:
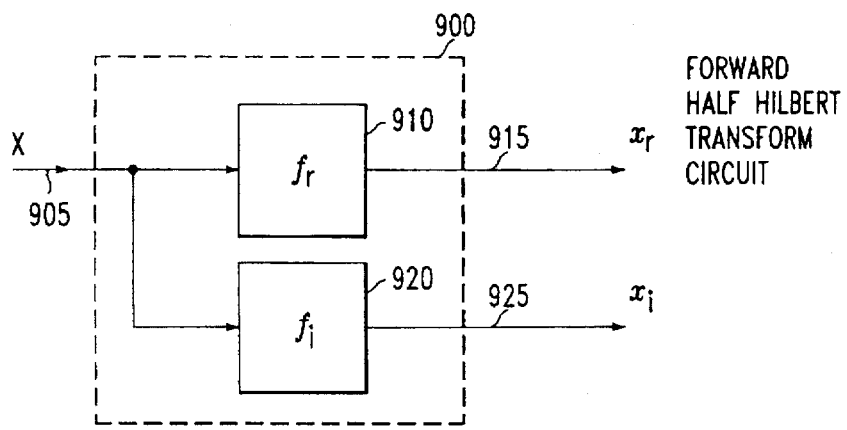
FIG. 9 depicts a real to complex Hilbert transform circuit.
Figure 10:
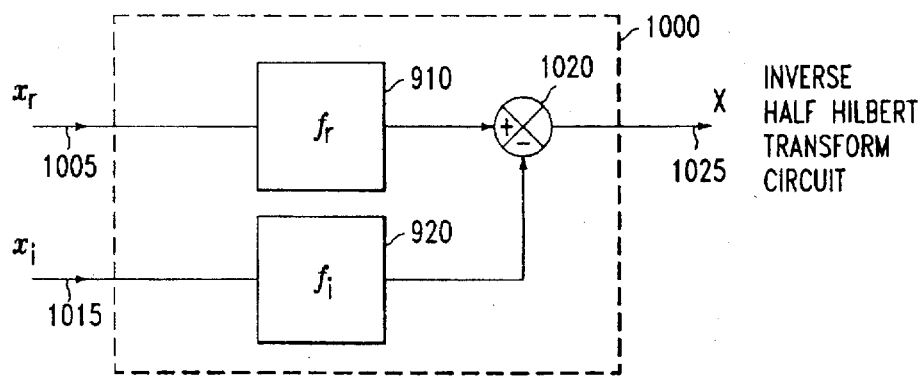
FIG. 10 depicts a complex to real Hilbert transform circuit.

To gain an appreciation of Hilbert transform circuits, we will diverge slightly to consider FIGS. 9–10. FIGS. 9 and 10 respectively depict a real to complex Hilbert transform circuit 900 and a complex to real Hilbert transform circuit 1000. In the case of circuit 900, real input signal X is applied over lead 905 to well-known linear time-invariant filters 910 and 920 which produce real and imaginary filtered signal components, $x_r$ and $x_i$, on leads 915 and 925, respectively. As to circuit 1000, which provides a complex to real Hilbert transform, incoming complex signal components $x_r$ and $x_i$ appearing on input leads 1005 and 1015 respectively, are applied through filters 910 and 920 with the resulting outputs of these filters being subtracted in combiner 1020 to produce a real output signal, X, on output lead 1025.

Now, as is the case with QAM modulators and demodulators, we recognize that VSB demodulators and modulators, e.g., 500 and 600 shown in FIGS. 5 and 6, both utilize Nyquist filters and Hilbert transform circuitry which can permit their re-use during demodulation and modulation (though not simultaneously). In addition, as discussed above, (sin x)/x compensation circuitry 650 can be implemented within equalizer 560, which itself is a filter, through judicious selection of fixed equalizer tap coefficients, thereby eliminating any need to use a separate (sin x)/x compensation circuit—just as we recognized (and previously discussed) with respect to QAM modulation and demodulation. Our invention utilizes strategically placed multiplexors to permit physical re-use of the Nyquist filters, the Hilbert transform circuitry and the equalizer for both VSB demodulation and modulation.

Figure 7B:
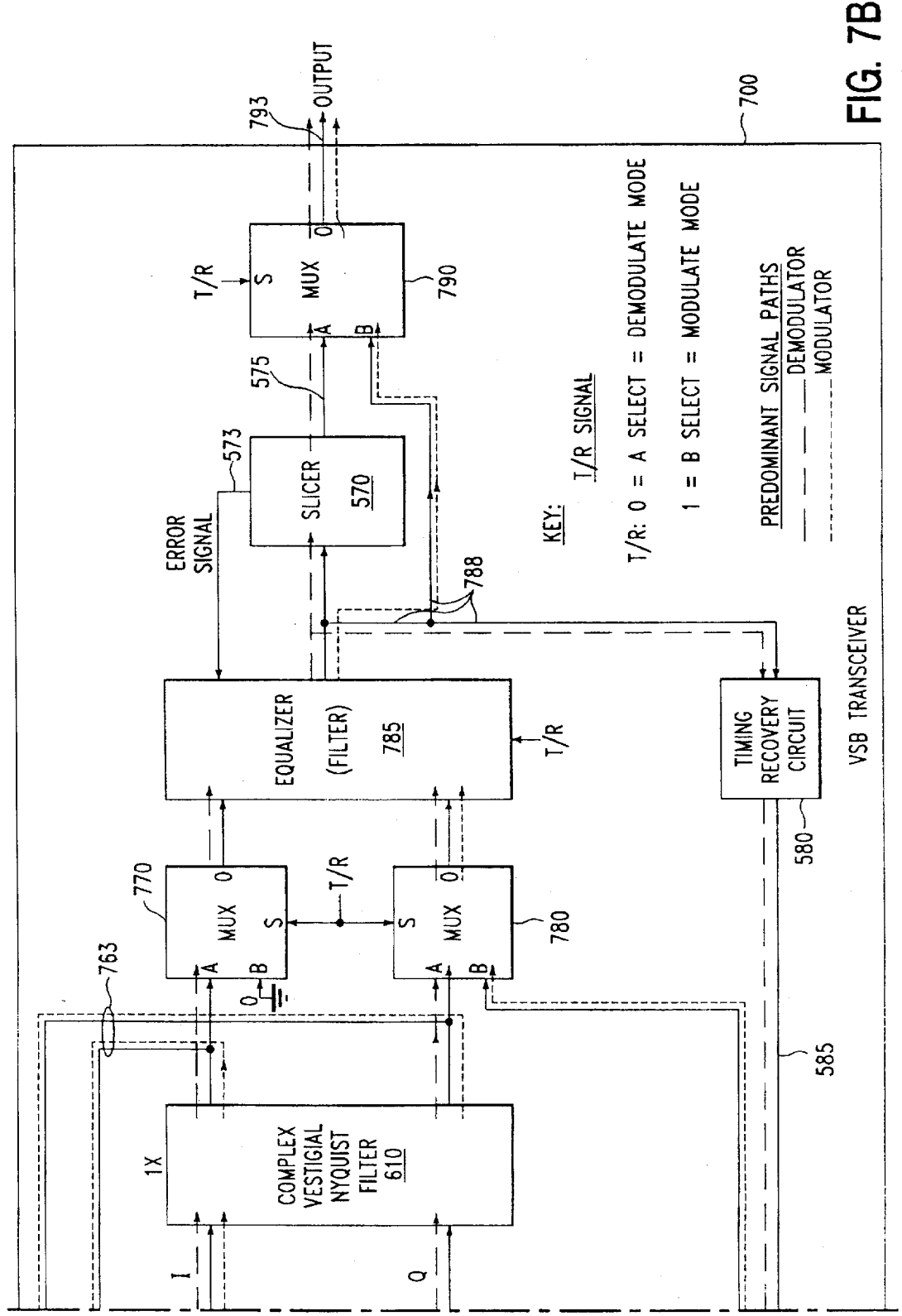

Given the above recognitions we made regarding VSB demodulation and modulation circuitry, our inventive VSB transceiver 700, which employs a VSB demodulator and a VSB modulator collectively implemented through shared resources is depicted in FIGS. 7A and 7B; with the correct alignment of the drawing sheets for these figures being shown in FIG. 7. Inasmuch as various stages of transceiver 700 are identical to those previously discussed in conjunction with FIGS. 5 and 6, the following discussion will not discuss those stages in any detail and instead will center on the differences between this circuit and the separate VSB demodulator and modulator circuits discussed above. In addition, to facilitate understanding—as with FIGS. 4A and 4B, the predominant signal paths in FIGS. 7A and 7B used for demodulation and modulation are respectively shown by long and short dashed lines.

As shown, the basic stages of transceiver 700, apart from the needed multiplexors, are complex Hilbert transform circuit 720, down-sampler 520, carrier recovery circuit 735, complex mixer 620, complex vestigial Nyquist filter 610, equalizer 785, slicer 570, timing recovery circuit 580, and up-sampler 630. To implement physical resource sharing, transceiver 700 also contains five separate multiplexing stages: multiplexors 710 and 715 positioned at a complex input to complex Hilbert transform circuit 720, multiplexors 730 and 740 positioned at one complex input to complex mixer 620, multiplexors 750 and 760 positioned at a complex input to complex vestigial Nyquist filter 610, multiplexors 770 and 780 positioned at a complex input to equalizer 785, and multiplexor 790 positioned immediately prior to output lead 793.

Figure 11:
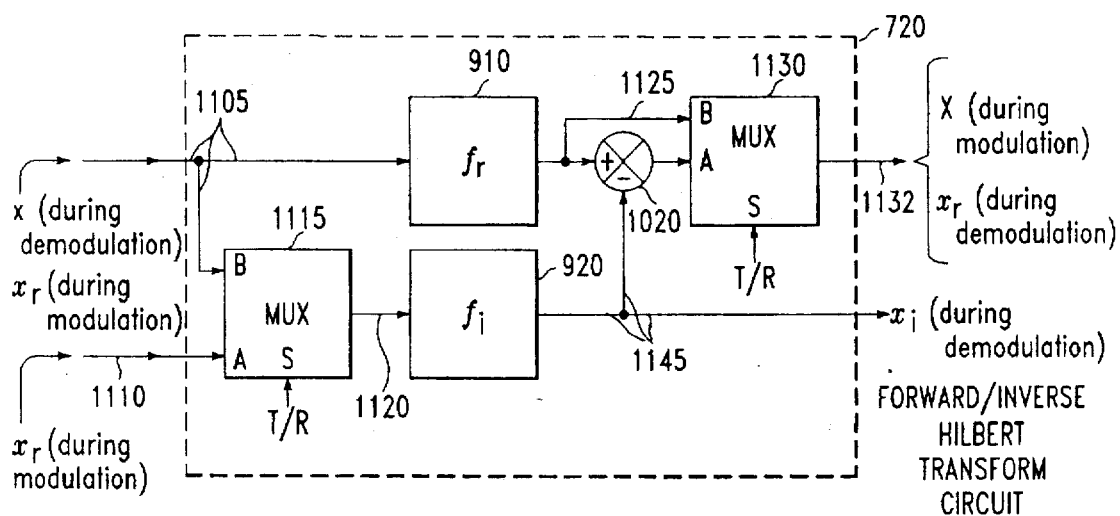
FIG. 11 depicts a reconfigurable Hilbert transform circuit.

As with transceiver 400 shown in FIGS. 4A and 4B, each of the multiplexors in transceiver 700, shown in FIGS. 7A and 7B, has two inputs, A and B, and one output, O, with, through the state of transmit/receive (T/R) (mode) signal applied to the select, S, input being low (i.e., 0) or high (i.e., 1), the signal connected to the A input or B input being routed to the output O of the multiplexor. In addition, the T/R signal is also applied to equalizer 785 in order to permit the equalizer tap weights to adaptively change, as needed in a VSB demodulator, or to set these weights to fixed values in order to implement (sin x)/x compensation for use in a VSB modulator. Furthermore, the T/R signal is also applied to carrier recovery circuit 735 to change its function from that, during demodulation, of providing phase-locked carrier recovery, i.e., the functionality of carrier recovery circuit 540, to, during modulation, that of providing a complex (sine and cosine) carrier frequency as required in VSB modulator 600. As noted below, the T/R signal is also applied to complex Hilbert transform circuit 720 to select an appropriate configuration of this circuit to use during either demodulation or modulation. The particular configuration is determined by the state of the T/R (mode) signal as applied to this circuit. In that regard, for VSB demodulation, i.e., with a low-level T/R signal, circuit 720 produces a complex output based solely on an in-phase input. Alternatively, for modulation and a high-level T/R signal, circuit 720 produces only an in-phase (real) output for a complex input. As such, using a complex Hilbert transform circuit with a selectable configuration, permits a single complex filter to be used during VSB demodulation and modulation, respectively, rather than has heretofore occurred through use of two separate half Hilbert transform circuits. Such a transform circuit, which we teach, is illustratively depicted in FIG. 11. To fully understand the functioning of circuit 1100, the reader should simultaneously refer to FIGS. 9–11 throughout the following discussion. In addition to filters 910, 920 and subtractive combiner 1020, which have been described previously, circuit 720 also contains multiplexors 1115 and 1130. Multiplexor 1115 functions as an input multiplexor to imaginary filter 920 and, based on the state of the T/R signal applied to a select (S) input to this multiplexor, routes either a singular real input, X, (appearing at the B input of this multiplexor) during receive (demodulation), or during transmission (modulation), an imaginary signal component input $x_i$, (appearing at the A input of this multiplexor) to the input of imaginary filter 920. Multiplexor 1130 functions as an output multiplexor, and based upon the state of the T/R signal applied to a select input of this multiplexor, routes either the real filtered signal component, $x_r$, produced by filter 910 (and appearing at input B of this multiplexor) during receive (demodulation) to output lead 1135, or the subtractively combined output, as real output, X, produced by summer 1020 (and appearing at input A of this multiplexor) during transmission (modulation) to this same output lead.

Returning to FIGS. 7A and 7B, with all the multiplexors configured to select their A inputs, i.e., with the T/R (mode) signal set to a receive (low) state, the active signal paths through circuit 700 define a VSB demodulator circuit. In this instance, an input modulated VSB signal is applied, via input lead 702, through the A inputs of multiplexor 710 to a real input of complex Hilbert transform circuit 720. Since the quadrature input to this Hilbert transform circuit is not used during de-modulation, multiplexor 715 merely routes, via its A input, zero-level ground potential to the quadrature input of the transform circuit. The resulting complex output of the Hilbert transform circuit is applied to down-sampler by two 520 with the decimated output thereof being applied, in turn, via the A inputs of multiplexors 730 and 740 and leads 733, to one complex input of complex mixer 620. The decimated output produced by down-sampler 520 is also routed, via leads 723, to carrier recovery circuit 735, which, in response to the low state of the T/R signal, produces a complex carrier signal phase-locked to a transmitted pilot tone in the decimated VSB signal stream. The phase-locked carrier frequency signal is applied, via leads 737, to another input of complex mixer 620. The resulting complex output of the mixer is applied, via A inputs of multiplexors 750 and 760, to a complex input of complex vestigial Nyquist filter 610. The resulting filtered complex signal produced by this filter is then applied, via the A inputs of multiplexors 770 and 780, to equalizer 785. Here, equalizer 785, as noted above, is configured by the low level T/R signal to adaptively vary its tap coefficients, as needed. In this instance, the equalizer functions, identically as does equalizer 560 shown in FIG. 5, in response to an error signal appearing on lead 573 and produced by slicer 570. A resulting in-phase output signal (symbol stream) produced by equalizer 785 is applied, as shown in FIGS. 7A and 7B, through lead 788 to slicer 570. Resulting output decisions produced by the slicer are applied, via the A input to multiplexor 790, to output lead 793, as output VSB decisions. These decisions are typically applied onward to a downstream forward error correction stage (not shown). In addition, the in-phase output of equalizer 785 is applied, via lead 788, to timing recovery circuit 580 which, in response thereto, recovers timing information for synchronous sampling. A resultant timing signal is applied, via lead 585, to control a variable oscillator (VCXO—not specifically shown) to produce a stream of clock pulses occurring at the symbol rate, or multiple thereof, for synchronized sampling. All the functional VSB demodulation signal processing, the active paths of which are indicated by long dashed lines, is the same as shown in FIG. 5. While equalizer 785 is shown as operating on a complex signal, as with equalizer 560 (shown in FIG. 5), equalizer 785 can be readily operated with just an in-phase input signal.

Alternatively, with all the multiplexors in circuit 700, shown in FIGS. 7A and 7B, configured through a high-level T/R (mode) signal, i.e., a transmit state, to select their B inputs, the active signal paths through circuit 700 define a VSB modulator. Here, input in-phase symbols are applied, through input lead 702 and via the B input to multiplexor 750, to an in-phase input of complex vestigial Nyquist filter 610. Inasmuch as a VSB signal does not contain quadrature symbols, a zero-valued ground potential is applied to the B input of companion multiplexor 760 and, through this multiplexor, routed to the quadrature input of filter 610. The resulting complex output of filter 610 is applied, via leads 763 and through the B inputs of both multiplexors 730 and 740 and thereafter through leads 733, to one input of complex mixer 620. The other complex input to this mixer is collectively sine and cosine waveforms supplied at a carrier frequency occurring at one-fourth the symbol rate. This complex carrier is provided, via leads 737, by carrier recovery circuit 735. As noted above, with a high-level T/R signal applied to the carrier recovery circuit, this circuit functions as a local oscillator to provide the complex carrier waveforms. The resultant complex multiplied output produced by mixer 620 is routed, via leads 742, to up-sampler by two 630. A resulting up-sampled complex output produced by the up-sampler is applied, via leads 748 and through the B inputs of multiplexors 710 and 715, to the complex input of Hilbert transform circuit 720. Through a high-level T/R signal applied to the Hilbert transform circuit, this circuit is configured to produce only an in-phase output signal for a complex input. The resulting in-phase output is routed, via the B input of multiplexor 780, to one input of equalizer 785. With a high-level T/R signal applied to the equalizer, the equalizer merely functions with appropriately fixed tap weights to implement (sin x)/x compensation. Accordingly, the output routed through the output of multiplexor 780 to one of the inputs of equalizer 785 is subjected to (sin x)/x compensation therein. The resulting compensated modulated in-phase signal is routed, via leads 788 and the B input of multiplexor 790, to output lead 793. All the functional VSB modulation signal processing, the active paths of which are indicated by short dashed lines, is the same as shown in FIG. 6.

Figure 8:
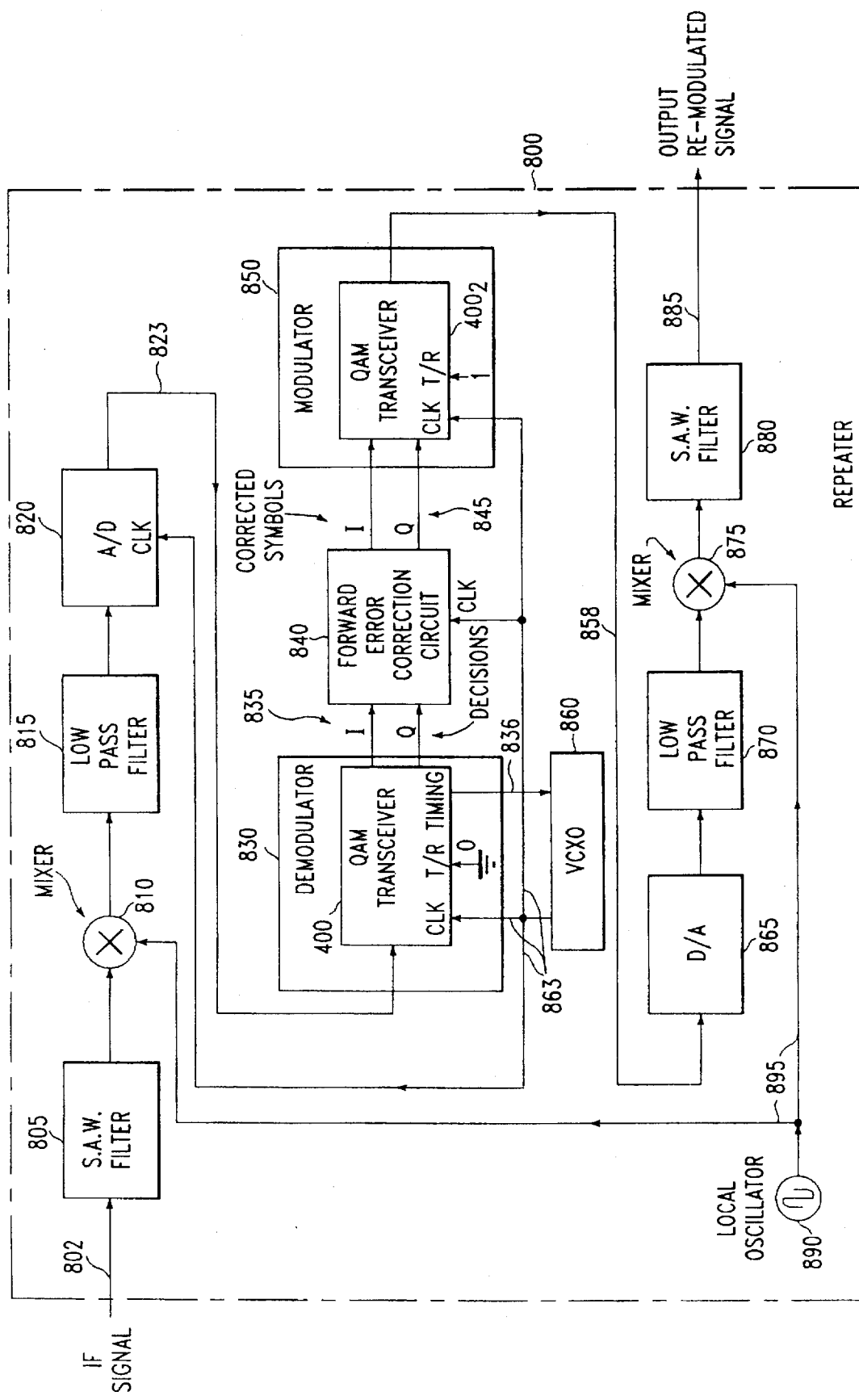
FIG. 8 depicts a QAM repeater implemented through use of our inventive shared resource QAM transceiver circuits.

Now, in view of our inventive teachings, FIG. 8 depicts a QAM repeater implemented through use of our inventive shared resource transceiver circuit 400. This circuit is particularly, though not exclusively, useful for QAM cable and other forms of long-haul QAM communication.

As shown, repeater 800 is formed of surface acoustical wave (SAW) filters 805 and 880, mixers 810 and 875, low pass filters 815 and 870, A/D converter 820, demodulator 830, forward error correction circuit 840, modulator 850, VCXO 860, D/A converter 865 and local oscillator 890. In operation, an incoming intermediate frequency (IF) modulated signal is applied to SAW filter 805 which being a narrow bandpass filter provides requisite passband channel selectivity and hence isolation of the modulated signal centered at the IF frequency. The output provided by this filter is applied to one input of mixer 810. The other input to this mixer is provided, via leads 895, by local oscillator 890 which produces an output frequency at approximately the symbol rate of the incoming modulated signal. These two inputs to mixer 810 are multiplied therein to form a resulting baseband signal centered at the symbol rate. The resultant analog signal produced by mixer 810 is applied through low pass filter 815 to remove any second-order (and higher) mixing terms and then digitized through A/D converter 820 by sampling at four times the symbol rate. The resulting digitized symbol stream, produced by the A/D converter and appearing on lead 823, is applied to an input of demodulator 830. Both demodulator 830 and modulator 850 are each formed of our inventive QAM transceiver circuit 400, with circuits $400_1$ and $400_2$ being used within demodulator 830 and modulator 850, respectively. The only difference between these two circuits is that circuit $400_1$ is configured to operate as a QAM demodulator, i.e., with a low level potential applied to its T/R input, while circuit $400_2$ is configured to operate as a QAM modulator, i.e., with a high level potential applied to its T/R input.

Resulting complex decisions produced by demodulator 830 are applied, via leads 835, to forward error correction (FEC) circuit 840. Circuit 840 is conventional with the specific form of error correction being the same as that, e.g., Reed-Solomon coding, used during origination of the transmitted QAM Signal received at the repeater. Corrected decisions supplied by FEC circuit 840 are applied, via leads 835, to modulator 850 which, in turn, generates a digital baseband modulated QAM signal. This digital signal is converted to analog by D/A converter 865. A resulting analog signal is applied to low pass filter 870 which functions as an anti-imaging filter, i.e., to remove any high frequency harmonics of the baseband modulated QAM signal. The resulting filtered signal is applied to one input of mixer 875, with the other input being the output frequency, appearing on lead 895, of local oscillator 890. Accordingly, mixer 875 translates the baseband modulated signal to passband centered at the intermediate frequency. The resulting IF modulated signal is applied through SAW filter 880 which functions as a highly selective channel mask to substantially prevent adjacent channel interference. The resulting re-modulated filtered output signal is applied to output lead 885. A/D converter 820, QAM transceivers $400_1$ and $400_2$, and FEC circuit 840 all operate in synchronism through a common source of clock pulses applied on leads 863 and produced at, e.g., the symbol rate by VCXO 860. To ensure proper synchronization with demodulated symbols, this VCXO receives a timing signal, via lead 836, from QAM transceiver circuit $400_1$.

Though we have shown repeater 800 as receiving and transmitting an IF signal, one or more complementary stages of conventional mixing (and appropriate conventional filtering, if needed) can be added to each of the input and output sides of the repeater to permit its operation with multiple carrier frequencies. Alternatively, the frequency of local oscillator 890 can be set to this carrier frequency thereby providing direct conversion to and from baseband without a need for indirect conversion to and from an IF frequency.

A VSB, rather than QAM, repeater can be readily implemented by merely substituting transceiver circuit 700 (see FIGS. 7A and 7B) for each of transceiver circuits $400_1$ and $400_2$, shown in FIG. 8. The one VSB transceiver circuit that would be substituted for QAM transceiver $400_1$ would be configured for use as a demodulator, i.e., with the state of the T/R signal being low; the other VSB transceiver substituting for QAM transceiver circuit $400_2$ would be configured for use as a modulator, i.e., with the state of the T/R signal being high. All the other elements of repeater 800 would remain essentially as shown, though, given that VSB only utilizes in-phase symbols, FEC circuit 840 would only operate on in-phase rather than complex symbols.

Clearly, by now, those skilled in the art will readily appreciate that while the above discussion only addressed signal streams down to the symbol level and the attendant resource sharing which our present invention permits in that context, our inventive teachings can be extended down to functional sharing at the bit level. In this case, various stages of circuitry that collectively convert symbols into a resulting bit stream, such as de-interleavers, and decoders (e.g., Reed-Solomon decoders) and also convert a bit stream into symbol streams, such as interleavers and encoders (e.g., Reed-Solomon encoders), could also be shared between modulation and demodulation functions. In addition, forward error correction circuitry could also be shared, as appropriate, between modulation and demodulation functions. By increasing the amount of shared resources used in a transceiver, circuit size, cost and complexity continue to advantageously decrease. While the above discussion addressed QAM and VSB circuitry, other forms of digital communication may utilize or be designed to utilize common circuit stages that readily permit them to be physically re-used in a transceiver to provide either modulation or demodulation—though not necessarily both simultaneously.

Although various embodiments which incorporate the teachings of the present invention have been shown and described in detail herein, those skilled in the art can readily devise many other varied embodiments that still incorporate these teachings.

We claim:

1. Apparatus for a quadrature amplitude modulated (QAM) demodulator/modulator comprising:

a complex multi-function filter, commonly used during QAM modulation and QAM demodulation and responsive to both an input signal and a mode signal, to provide an output filtered signal, wherein the multi-function filter imparts a different pre-defined function to the input signal corresponding to a current state of the mode signal; the mode signal being either in a pre-defined first or second state signifying QAM demodulation or QAM modulation, respectively; wherein the filter, during QAM demodulation and in response to the first state of the mode signal, equalizes the input signal such that the output filtered signal is an equalized version of the input signal, and the filter, during QAM modulation and in response to the second state of the mode signal, imparts a pre-defined frequency response characteristic to the input signal such that the output filtered signal is a frequency compensated version of the input signal; and a first multiplexor, responsive to the mode signal, for selectively routing as the input signal to the complex multi-function filter either, during QAM demodulation, a complex Nyquist filtered QAM modulated signal or, during QAM modulation, Nyquist filtered symbols.

2. The apparatus in claim 1 further comprising:

a complex Nyquist filter, commonly used during modulation and demodulation, for providing a Nyquist filtered output signal; and a second multiplexor, responsive to the mode signal, for providing as an input signal to the complex Nyquist filter either, during QAM demodulation, an incoming QAM modulated signal or, during QAM modulation, a stream of complex symbols.

3. The apparatus in claim 2 wherein the complex Nyquist filter comprises first and second multi-tap filters each having a plurality of tap coefficients associated therewith, wherein the plurality of tap coefficient values for the first and second multi-tap filters is respectively set to first and second series of pre-determined values that equal a series of predefined tap coefficient values multiplied by respectively a series of sine or cosine values of a frequency equal to a predefined fraction of the symbol rate.

4. The apparatus in claim 3 further comprising:

an output circuit, responsive to the mode signal and the output filtered signal, for generating as an output signal from the apparatus, during QAM demodulation, output complex decisions based on the equalized version of the input signal, provided by the multi-function filter, and for providing, as the output signal from the apparatus, during QAM modulation, the frequency compensated version of the input signal, provided by the multi-function filter, as a modulated QAM signal.

5. The apparatus in claim 4 further comprising a first up-sampling circuit for sampling a stream of incoming complex samples, occurring at a symbol rate, by a pre-defined multiple of the symbol rate so as to provide the stream of complex samples to the second multiplexor.

6. The apparatus in claim 5 further comprising:

a first down-sampling circuit for reducing a sampling rate of the Nyquist filtered output signal by a pre-defined multiple of the symbol rate so as to provide the complex filtered QAM signal to the first multiplexor; and a summer for summing both in-phase and quadrature components of the Nyquist filtered output signal together so as to provide the Nyquist filtered symbols to the first multiplexor.

7. The apparatus in claim 6 wherein the predefined frequency response characteristic imparted by the complex multi-function filter during QAM modulation is a predefined high pass filter function.

8. The apparatus in claim 7 wherein the predefined high pass filter function is a (sin x)/x compensation function.

9. The apparatus in claim 6 wherein the output circuit comprises:

a second down-sampling circuit for down-sampling, by half, the output filtered signal produced by the complex multi-function filter so as to produce a downsampled signal; and a carrier recovery and slicing circuit, responsive to said downsampled signal, for producing the output complex decisions.

10. The apparatus in claim 9 wherein, during de-modulation, the complex multi-function filter is adaptive with adaptation being controlled by an error signal, the error signal being generated by the carrier-recovery and slicing circuit.

11. The apparatus in claim 10 wherein the output circuit further comprises:

a third multiplexor for routing to an output lead and as a real component of the output signal from the apparatus, during QAM modulation and in response to the mode signal, either the in-phase portion of the filtered output signal as the modulated QAM signal or, during QAM demodulation, in-phase decisions produced by the carrier recovery and slicing circuit.

12. The apparatus in claim 6 wherein the first down-sampling circuit comprises a down-sampler that reduces the sampling rate of the filtered signal by half.

13. The apparatus in claim 6 wherein the first up-sampling circuit comprises first and second up-samplers, respectively connected to in-phase and quadrature components of the stream of incoming complex symbols, for increasing a sampling rate, of the in-phase and quadrature components of the incoming digital complex symbols, by four.

14. The apparatus in claim 13 wherein each of the first and second up-samplers inserts three zero values between each pair of adjacent input values applied to an input of said each up-sampler.

15. The apparatus in claim 6 further comprising:

a timing recovery circuit, responsive during QAM demodulation to the Nyquist filtered output signal, for providing an output timing signal for use in synthesizing a sample clock synchronized to a stream of symbols in the incoming QAM modulated signal.

16. Apparatus for a repeater for quadrature amplitude modulated (QAM) digital signals comprising:

first and second transceiver circuits, wherein the first transceiver circuit demodulates a stream of incoming modulated digital QAM symbols so as to produce a stream of complex digital decisions and the second transceiver circuit modulates said decisions so as to produce an output QAM modulated signal, each of said first and second transceivers comprising:

a complex multi-function filter, commonly used during QAM modulation and QAM demodulation and responsive to both an input signal and a mode signal, to provide an output filtered signal, wherein the multi-function filter imparts a different pre-defined function to the input signal corresponding to a current state of the mode signal; the mode signal being either in a pre-defined first or second state signifying QAM demodulation or QAM modulation, respectively; wherein the filter, during QAM demodulation and in response to the first state of the mode signal, equalizes the input signal such that the output filtered signal is an equalized version of the input signal and, during QAM modulation and in response to the second state of the mode signal, imparts a predefined frequency response characteristic to the input signal such that the output filtered signal is a frequency compensated version of the input signal; and a first multiplexor, responsive to the mode signal, for selectively routing as the input signal to the complex multi-function filter either, during QAM demodulation, a complex Nyquist filtered QAM modulated signal or, during QAM modulation, Nyquist filtered symbols.

17. The apparatus in claim 16 wherein each of said transceiver circuits further comprises:

a complex Nyquist filter, commonly used during modulation and demodulation, for providing a Nyquist filtered output signal; and a second multiplexor, responsive to the mode signal, for providing as an input signal to the complex Nyquist filter either, during QAM demodulation, an incoming QAM modulated signal or, during QAM modulation, a stream of complex symbols.

18. The apparatus in claim 17 wherein the complex Nyquist filter comprises first and second multi-tap filters each having a plurality of tap coefficients associated therewith, wherein the plurality of tap coefficient values for the first and second multi-tap filters is respectively set to first and second series of pre-determined values that equal a series of predefined tap coefficient values multiplied by respectively a series of sine or cosine values of a frequency equal to a predefined fraction of the symbol rate.

19. The apparatus in claim 18 wherein each of said transceiver circuits further comprises:

an output circuit, responsive to the mode signal and the output filtered signal, for generating as an output signal from the apparatus, during QAM demodulation, output complex decisions based on the equalized version of the input signal, provided by the multi-function filter, and for providing, as the output signal from the apparatus, during QAM modulation, the frequency compensated version of the input signal, provided by the multi-function filter, as a modulated QAM signal.

20. The apparatus in claim 19 wherein each of said transceiver circuits further comprises a first up-sampling circuit for sampling a stream of incoming complex samples, occurring at a symbol rate, by a pre-defined multiple of the symbol rate so as to provide the stream of complex samples to the second multiplexor.

21. The apparatus in claim 20 wherein each of said transceiver circuits further comprises:

a first down-sampling circuit for reducing a sampling rate of the Nyquist filtered output signal by a pre-defined multiple of the symbol rate so as to provide the complex filtered QAM signal to the first multiplexor; and a summer for summing both in-phase and quadrature components of the Nyquist filtered output signal together so as to provide the Nyquist filtered symbols to the first multiplexor.

22. The apparatus in claim 21 wherein the predefined frequency response characteristic imparted by the complex multi-function filter during QAM modulation is a predefined high pass filter function.

23. The apparatus in claim 22 wherein the predefined high pass filter function is a (sin x)/x compensation function.

24. The apparatus in claim 21 wherein the output circuit comprises:

a second down-sampling circuit for down-sampling, by half, the output filtered signal produced by the complex multi-function filter so as to produce a downsampled signal; and a carrier recovery and slicing circuit, responsive to said downsampled signal, for producing the output complex decisions.

25. The apparatus in claim 24 wherein, during de-modulation, the complex multi-function filter is adaptive with adaptation being controlled by an error signal, the error signal being generated by the carrier-recovery and slicing circuit.

26. The apparatus in claim 25 wherein the output circuit further comprises:

a third multiplexor for routing to an output lead and as a real component of the output signal from the apparatus, during QAM modulation and in response to the mode signal, either the in-phase portion of the filtered output signal as the modulated QAM signal or, during QAM demodulation, in-phase decisions produced by the carrier recovery and slicing circuit.

27. The apparatus in claim 21 wherein the first down-sampling circuit comprises a down-sampler that reduces the sampling rate of the filtered signal by half.

28. The apparatus in claim 21 wherein the first up-sampling circuit comprises first and second up-samplers, respectively connected to in-phase and quadrature components of the stream of incoming complex symbols, for increasing a sampling rate, of the in-phase and quadrature components of the incoming digital complex symbols, by four.

29. The apparatus in claim 28 wherein each of the first and second up-samplers inserts three zero values between each pair of adjacent input values applied to an input of said each up-sampler.

30. The apparatus in claim 21 wherein each of said transceiver circuits further comprises:

a timing recovery circuit, responsive during QAM demodulation to the Nyquist filtered output signal, for providing an output timing signal for use in synthesizing a sample clock synchronized to a stream of symbols in the incoming QAM modulated signal.

* * * * *